United States Patent [19]
Herst

[11] 3,888,494
[45] June 10, 1975

[54] CONTAINER HAVING DISAPPEARING FRONT PANEL

[75] Inventor: Richard J. Herst, Woodland Hills, Calif.

[73] Assignee: Car Tapes Inc., Chatsworth, Calif.

[22] Filed: Aug. 1, 1973

[21] Appl. No.: 384,784

[52] U.S. Cl. .......... 274/2; 312/7; 360/137
[51] Int. Cl. .......... G11b 1/60
[58] Field of Search .......... 274/2; 360/137, 85, 93; 312/7, 8; 325/312

[56] References Cited

UNITED STATES PATENTS

| | | | |
|---|---|---|---|
| 2,498,898 | 2/1950 | Rieth | 312/7 R |
| 2,627,556 | 2/1953 | Peterson et al. | 312/7 R |
| 3,800,328 | 3/1974 | Harlan | 360/137 |

*Primary Examiner*—Harry N. Haroian
*Attorney, Agent, or Firm*—Marvin H. Kleinberg

[57] ABSTRACT

A container holding a plurality of electronic components and adapted to receive a multi-channel tape cartridge. The front portion of the container is normally closed by means of a pivotable panel that is adapted to rotate upon the insertion of the tape cartridge. The opposing side of the normally closed panel contains a plurality of control elements associated with the electronics located within the housing. Inserting the tape cartridge rotates the panel and exposes the controls located on the opposite side of the panel whereas withdrawing the tape cartridge allows the panel to be normally closed thereby exposing the normally closed surface of the panel.

6 Claims, 3 Drawing Figures

CONTAINER HAVING DISAPPEARING FRONT PANEL

This invention relates to a tape cartridge housing assembly and more particularly to a housing assembly having a pivotable front cover which normally covers the assembly when not in use and exposes a plurality of controls located on the reverse side of the pivotable cover whenever a tape cartridge is inserted into the housing assembly for operation.

The tape cartridge housing assembly is intended for use as an item to be added to an existing sound transcribing system presently located in a moving vehicle such as a car, truck, mobile home or boat.

The housing assembly accepts the multi-channel tape cartridge presently being manufactured today and also contains the necessary controls for the operator to adjust the volume, the balance in a stereo system, the tone, and a switch to select any of the plurality of channels located on the tape itself. The housing assembly is usually located in the dashboard if there is room or below the dashboard on a suitable bracket that allows easy access to the user when in the normal driving position.

It is not uncommon for people enjoying their own recorded music in the format of a multi-channel tape cartridge to have a large selection of assorted tape cartridges located in the vehicle, which selection may represent an investment of many hundreds of dollars in tape cartridges. The presence of a tape cartridge housing assembly located in or near the dashboard of a moving vehicle is unfortunately an invitation to the unscrupulous that the vehicle may contain a large inventory of such tape cartridges.

The present invention is concerned primarily with a tape cartridge housing assembly that has a normally closed front cover that completely covers the front portion of the housing assembly without revealing to the observer that it is a tape cartridge player. It is expected that persons looking into the vehicle will therefore not recognize the kind of electronic device behind the cover and hence will be given no additional information of whether the device is a tape cartridge assembly or not and hence in this small way provide added protection to the owner of the vehicle against potential burglaries whether by professionals or by impulsive acts of individuals. In addition, the fact that the front cover is pivotable to its normally closed position when the tape cartridge is removed provides unusual protection for the electrical controls which are positioned on the reverse side of the front cover and are thereby swung to a completely enclosed interior position from which dust and other environmental degrading agents are excluded.

The typical tape cartridge housing assembly contains an opening for accepting a multi-channel tape cartridge which is normally inserted into the opening into a nesting relationship with the housing assembly. Inserting the tape cartridge actuates a micro-switch which automatically turns the electrical system into an On position causing the unit to operate, leaving to the operator the means for selecting the channel, controlling the volume, the balance and the tone to his desires. Withdrawal of the tape cartridge deactuates the micro-switch to turn off the electrical system.

In the present invention the front operating portion of the housing assembly is covered by a pivotable front cover having a first nondescript side and a second side which contains a plurality of individual controls necessary to electrically operate the sound system. Inserting the tape cartridge against the cover and into a nesting position with the housing causes the cover to rotate inwards approximately 90° to a position in which the operating levers and indicators of the electrical controls are presented to operator view and access. The tape cartridge assembly, upon insertion, not only causes the cover to rotate, but also holds the cover in the open position. If desired, the open cover may also be held in this fully open position by a resilient catch, so that thereafter, during continued play, the operator can remove one cartridge and insert another without any interference. After completion of play, the cartridge is withdrawn and the operator may close the cover which is then caught, by another catch, in its fully closed position. As indicated, the cover in the rotated position exposes to view and access a plurality of controls such as the volume control, the balance control, and the tone control, which are fixedly attached to the reverse side of the front cover. Electrical connections are provided between the controls and the operating portions of the electronics by means of extended length wires located within the housing assembly.

The operator controls the tape cartridge player in the same fashion as before while the cartridge is inserted into the housing assembly. Removing the cartridge from the housing assembly allows the starting switch to open which automatically turns off the electronics in a conventional manner and allows the front cover to be rotated by the operator to the normally closed position which exposes the nondescript side of the cover.

Further objects and advantages of the present invention will be made more apparent by referring now to the accompanying drawing wherein.

Figure 1:
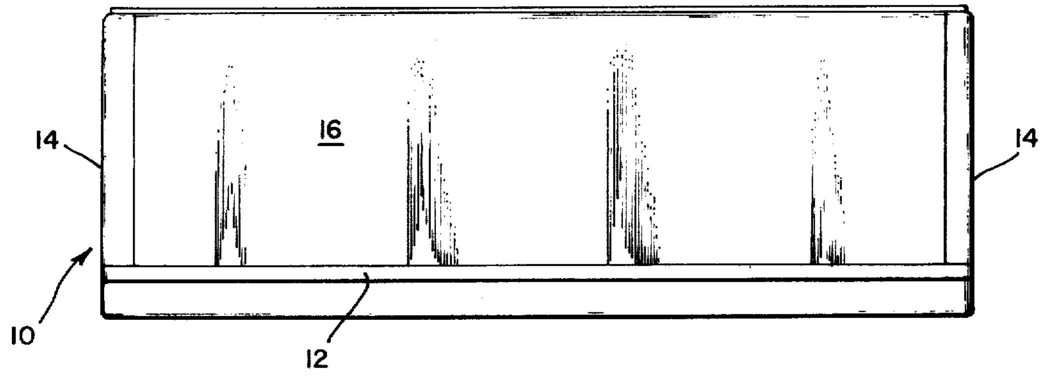
FIG. 1 illustrates a tape cartridge housing assembly constructed according to the principles of the present invention with the pivotal front cover in the normally closed position.

Referring now to FIG. 1 there is shown a front view of a tape cartridge housing assembly 10 having a base portion 12 and side members 14 that are pivotably connected to a front cover 16. The front cover 16 is shown in the normally closed position with the unadorned side of the cover exposed to the outside. In this position there is no evidence to the casual observer what is contained in the housing assembly and there is no restriction on where the housing assembly may be located in the vehicle. In addition, all interior components and especially the relatively dust sensitive electrical control components affixed to the reverse side of the cover 16, are thoroughly protected from dust and other environmental agents which might degrade the performance of the components.

Figure 2:
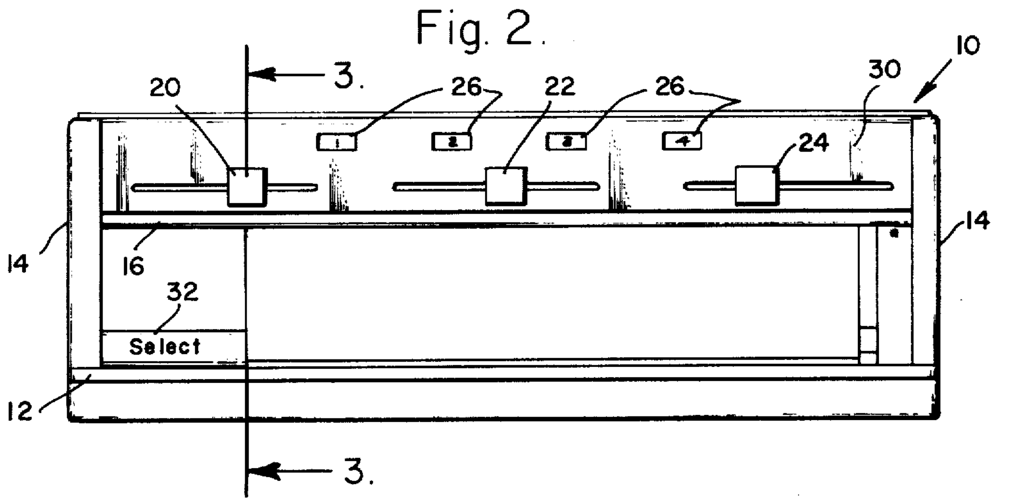
FIG. 2 illustrates the tape cartridge assembly of FIG. 1 with the cover in the open or operating position.

Referring now to FIG. 2 there is shown the housing assembly 10 with the front cover 16 in a rotated position caused by the insertion of a tape cartridge into the housing assembly 10.

The front cover 16 is pivoted about a horizontal axis that is located above the center line of the cover thereby allowing the cover to be rotated by the action of the tape cartridge being urged against the lower portion of the cover as the cartridge is inserted into its nesting position within the housing assembly 10. The cover 16 has a normal or preferred closed position as shown in FIG. 1 and hence will stay in the open position as illustrated in FIG. 2 only as long as the tape cartridge is inserted into the housing assembly 10. Removing the cartridge from the nesting position within the housing assembly 10 will allow the cover 16 to return to its normally closed position as illustrated in FIG. 1.

The reverse side of the cover 16 contains a plurality of control and indicator elements 20, 22, 24 and 26, that are fixedly attached to the reverse side of cover 16. In the embodiment of FIG. 2, elements 20, 22 and 24 are slide levers which extend through a panel 30 to control corresponding electrical control potentiometers which are positioned behind panel 30. Elements 26 are indicators visible through windows in panel 30.

Figure 3:
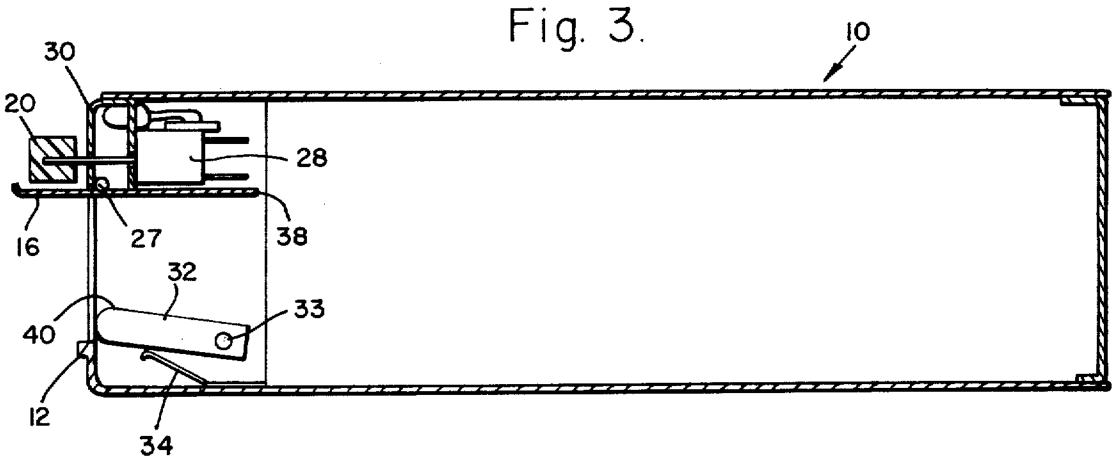
FIG. 3 is a side sectional view along the line 3—3 assembly illustrated in FIG. 2 illustrating the plurality of controls located on the reverse side of the rotatable cover.

Referring now to FIG. 3 there is shown a cross-sectional view along the line 3—3 of the tape cartridge housing assembly shown in FIG. 2 with the front cover 16 rotated 90° about a pivot axis 27. As shown in FIG. 3, control lever 20 operates a slide potentiometer 28 fixedly attached to the reverse side of cover 16 and hidden from view by means of panel 30 which as shown is also affixed to the reverse side of front cover 16.

Referring still to FIG. 3, a pivotable select switch key 32, pivoted about pivot axis 33 and supported by a resilient contact spring 34, is positioned towards the side front area of housing assembly 10, so that it is accessible for manual operation when the cover 16 has been rotated to its open position by insertion of a tape cartridge. It should be understood that the electrical system of housing assembly 10 is on when a cartridge is inserted, and therefore during this period, an operator may use selector switch key 32 to electrically control the selection of tape channels. Such use and selection may be effected by the operator pressing downwards momentarily upon select switch key 32 to thereby depress its supporting spring contact 34 which may then make a momentary connection with other contacts not shown to electrically order an advance from one tape channel to another tape channel. When the tape cartridge is removed from the housing assembly 10 and the electrical system is therefore off, select switch key 32 will then have no electrical function and is then used as a purely mechanical element to facilitate latching or catching of front cover 16 in its closed position. It is apparent from examination of FIG. 3 that, when cover 16 is rotated to its closed position, the bottom edge 38 of cover 16 will be in heavy frictional engagement with the corresponding surface area 40 of the spring loaded select switch key 32, thereby latching or catching front cover 16 in its closed position because of the purely mechanical interaction between cover 16 and select switch key 32. In this manner the mechanical interference between switch key 32 and the pivoting front cover 16 is actually used to advantage to assist in desired operation of cover 16 rather than presenting an impediment to such operation.

What is claimed as new is:

1. An assembly for housing a tape cartridge and related play-back equipment, comprising in combination:

a tape cartridge housing having an open front portion to permit insertion of a tape cartridge; and a cover having a first side for substantially covering the open front portion of said housing and a second side having mounted thereon a plurality of control elements associated with the play-back equipment, said cover being pivotably mounted to rotate in the open front portion of said housing about an axis whose frontward projection traverses a central region of the first side of said cover in its outwardly disposed position before said tape cartridge has been inserted, said cover being forced to pivot by insertion of a tape cartridge to a portion in which said control elements mounted on said second side of said cover are exposed for use in said open front portion of said housing.

2. A combination according to claim 1 in which said cover is rotated substantially 90° by insertion of the tape cartridge.

3. A combination according to claim 1 in which said cover is pivoted about a horizontal axis that is parallel to but separated from the center line of said cover.

4. A tape cartridge housing assembly having a front surface portion including a cavity opening adapted to receive a tape cartridge unit, a cover pivotably mounted in said housing assembly and normally in a closed position for covering said front surface portion of said housing assembly and concealing said cavity opening, said cover havin a first side and a second side, said second side having mounted thereon a plurality of control elements associated with said housing assembly, said cover in its normally closed position exposing said first side and enclosing and concealing said second side and said control elements within said housing assembly, said cover in its normally closed position being forced to pivot by the pressing of a tape cartridge against a predetermined area of said cover about an axis whose frontward projection traverses a central region of the first side of said cover in its normally closed position to admit the tape cartridge unit into said cavity opening and to simultaneously expose said second side of said cover to place said plurality of control elements in an operating position.

5. A combination according to claim 4 in which insertion of a tape cartridge into said cavity opening rotates said cover to a position at which said cover is substantially orthogonal to the front surface of said housing assembly.

6. A combination according to claim 4 in which said housing assembly has a spring loaded operating key mounted therein, said key being positioned to be depressed by said cover when said cover is pivoted to its closed position.

* * * * *